June 25, 1957     R. R. YANNONE     2,796,689
PICTURE FRAME
Filed Nov. 23, 1954     2 Sheets-Sheet 1
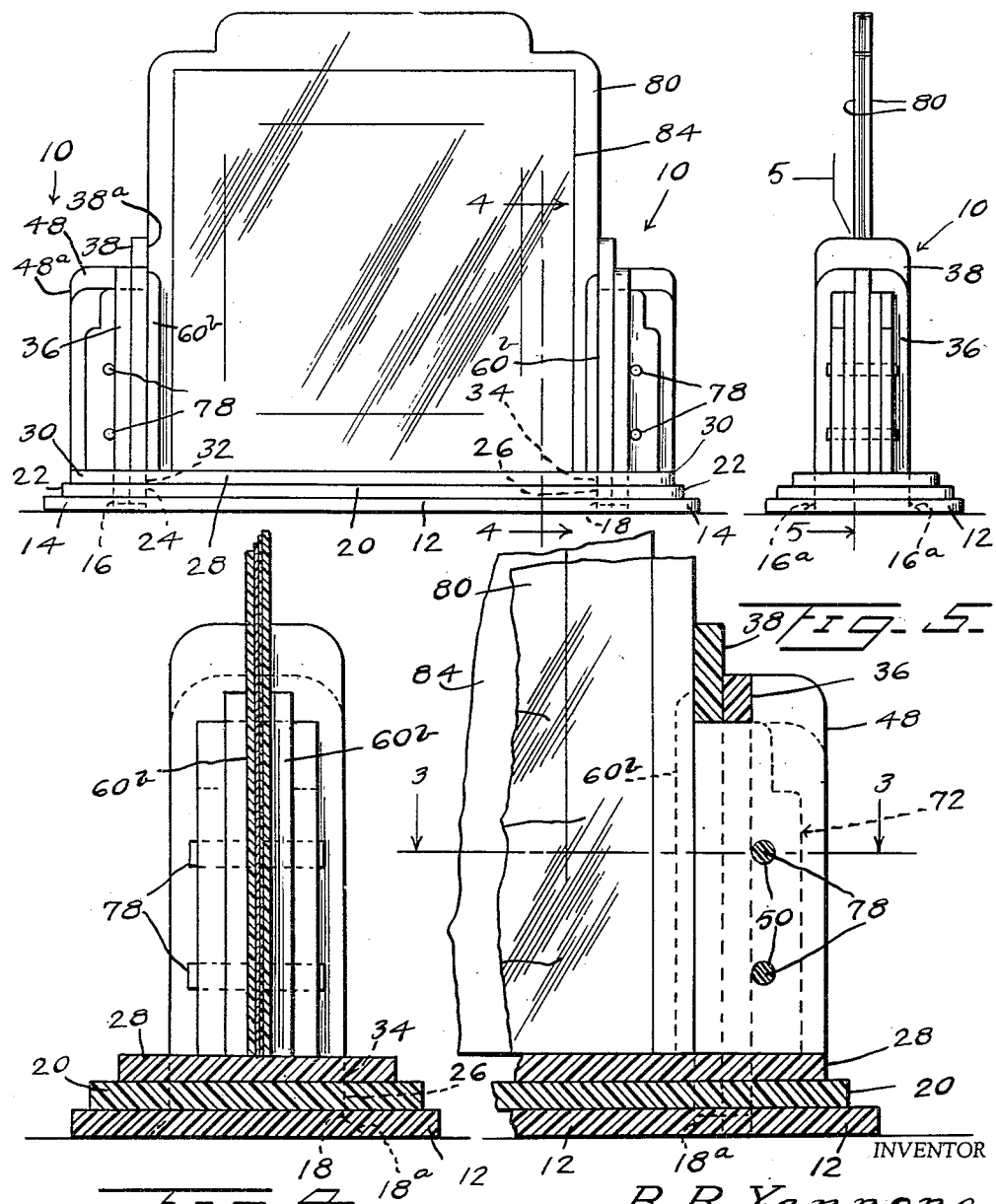
INVENTOR
R. R. Yannone
BY Kimmel & Crowell
ATTORNEYS

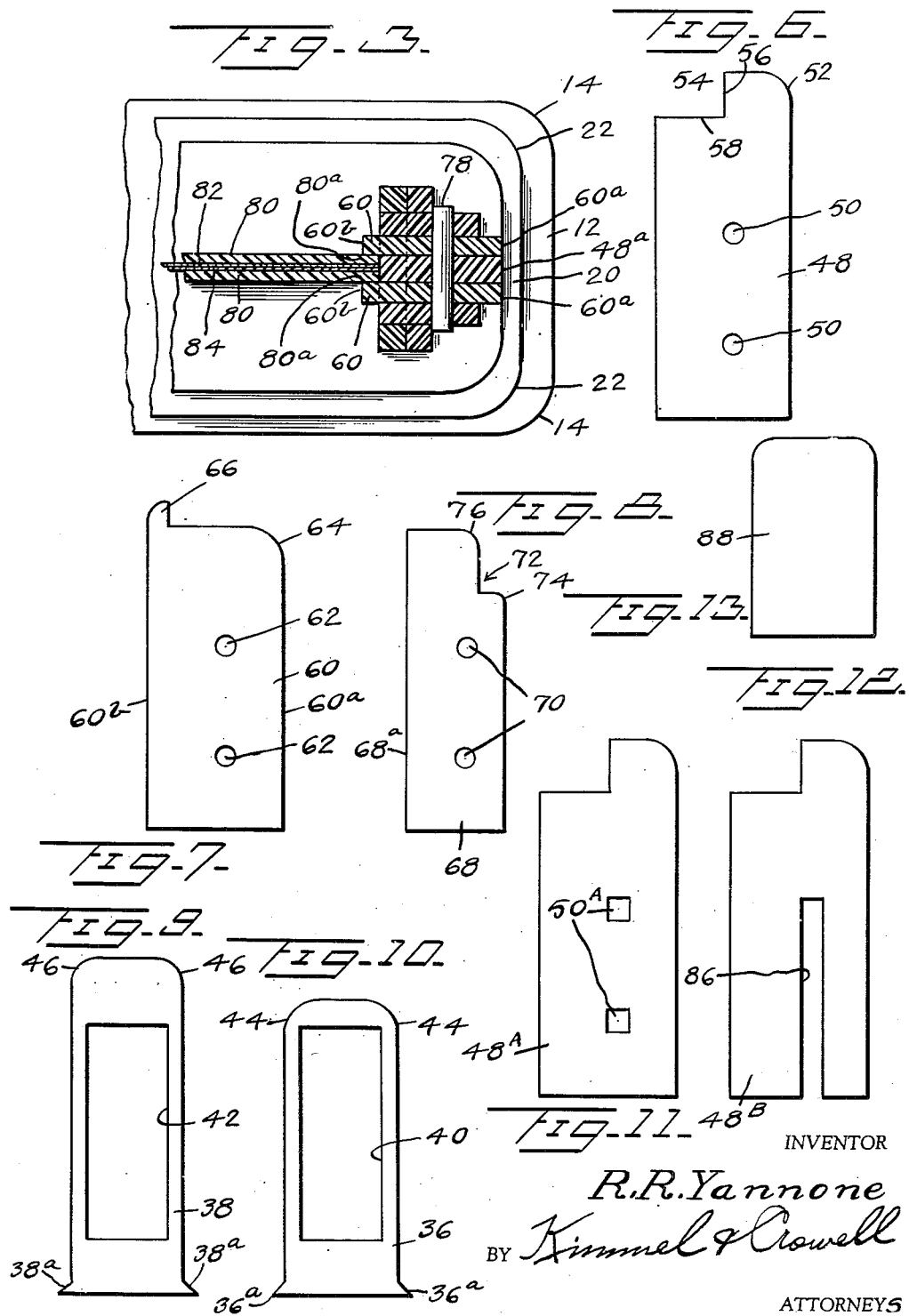

United States Patent Office 2,796,689
Patented June 25, 1957

2,796,689

PICTURE FRAME

Ralph R. Yannone, Fremont, Nebr.

Application November 23, 1954, Serial No. 470,695

6 Claims. (Cl. 40—152.1)

This invention relates to a display support, and more specifically, the invention pertains to picture frames.

One of the primary objects of this invention is to provide a picture frame for the simultaneous display of a pair of pictures.

Another object of this invention is to provide a picture frame for the simultaneous display of a pair of pictures supported therein in back-to-back relationship, together with means for facilitating the changing of the pictures.

A further object of this invention is to provide a picture frame for the display of a plurality of pictures, the picture frame being formed of transparent plastic material and which may be easily assembled and disassembled without the use of tools.

A still further object of this invention is to provide a picture frame for the display of a plurality of pictures placed in back-to-back relationship, the picture frame being constructed of a plurality of transparent plastic elements which may be inexpensively manufactured, is non-complex in assembly, and durable in use.

Other and further objects and advantages of this invention will become more apparent from a consideration of the following specification when read in conjunction with the annexed drawings, in which:

Figure 1 is a side elevation of a picture frame constructed in accordance with the present invention.

Figure 2 is an end elevational view of the picture frame shown in Figure 1.

Figure 3 is an enlarged partial detail cross-sectional view taken on the horizontal plane of line 3—3 of Figure 5, looking in the direction of the arrows.

Figure 4 is an enlarged detail cross-sectional view taken on the vertical plane of line 4—4 of Figure 1, looking in the direction of the arrows.

Figure 5 is an enlarged partial detail cross-sectional view taken on the vertical plane of line 5—5 of Figure 2, looking in the direction of the arrows.

Figure 6 is an enlarged side elevation of a spacer element constructed in accordance with one embodiment of this invention.

Figure 7 is an enlarged side elevation of a guide member constructed in accordance with one embodiment of this invention.

Figure 8 is a side elevation of a filler member constructed in accordance with one embodiment of this invention.

Figure 9 is a side elevational view of a standard constructed in accordance with the present invention.

Figure 10 is a side elevational view of a second standard constructed in accordance with this invention.

Figure 11 is a side elevational view of a spacer element constructed in accordance with a second embodiment of this invention.

Figure 12 is a side elevational view of a spacer member constructed in accordance with a third embodiment of this invention.

Figure 13 is a side elevational view of a locking element adapted for use with the invention as practiced by the third embodiment thereof.

Referring now more specifically to the drawings, reference numeral 10 designates, in general, a picture frame constructed in accordance with the teachings of this invention. The picture frame 10 may be constructed of any desired rigid material such as, for example, wood, metal or plastic material, and preferably, the frame is made of a transparent material such as Plexiglas.

In the drawings, reference numeral 12 indicates an elongated substantially rectangular primary base member having rounded corners 14 and substantially rectangular slots 16, 18, one being disposed adjacent each end thereof and extending transversely of its longitudinal axis.

A second base member 20, having an elongated substantially rectangular configuration, is superposed on the primary base member 12. The secondary base member 20 is provided with rounded corners 22 and a pair of substantially rectangular slots 24, 26 one adjacent each end thereof, which extend transversely of its longitudinal axis. The length and width of the secondary base member 20 are of smaller dimensions than the corresponding dimensions of the primary base member 12, while the slots of each are of substantially equal dimensions and are positioned in alignment.

A tertiary base member 28, having a substantially rectangular configuration, is juxtaposed on the secondary base member 20 in face-to-face contact therewith and is provided with rounded corners 30. Slots 32, 34 are formed in the tertiary base member 28, one adjacent each end thereof, the slots having an elongated substantially rectangular configuration and extending transversely of the longitudinal axis thereof. The length and width of the tertiary base member 28 are less than the corresponding dimensions of the secondary base member 20 while the slots 32, 34 are of the same dimensions as the slots 16, 18, 24 and 26 and are aligned with the corresponding slots at each end of the primary and secondary bases.

As is seen in the drawings, the primary, secondary and tertiary base members 12, 20 and 28, respectively, are positioned so that their respective longitudinal and transverse axes are aligned, one with the others.

A pair of elongated substantially rectangular vertical standards 36, 38 are juxtaposed with respect to each other at each end of the base members and one pair thereof is inserted through the aligned slots 16, 24 and 32 to project upwardly above the tertiary base 28. The other pair of standards 36, 38 is inserted through the slots 18, 26 and 34 and also project above the tertiary base. The standards 36, 38 are each provided with outwardly diverging dove-tail ends 36a, 38a which seat and are wedged in the dove-tail opening 16a which extends downwardly from the opening 16 formed in one end of the primary base member 12. The standards 36, 38 are arranged within their respective slots with the standard 36 proximate to and standard 38 remote from their respective adjacent ends of the base frame members 12, 20 and 28. Each pair of the standards 36, 38 is provided with a vertically elongated substantially rectangular slot 40 and 42, respectively, of identical dimensions which are aligned with each other and the similar slots formed in the other pair thereof, and the corners 44, 46 at the upper ends thereof are rounded. As is seen in the figures, the length and width of the standards 36 are of lesser dimensions than the corresponding length and width of the standards 38 (see Figures 9 and 10).

The frame 10, at each end thereof, is provided with an elongated substantially rectangular spacer member 48 (see Figure 7) having a pair of vertically spaced and aligned openings 50, a rounded upper corner 52 at one side thereof and a notch 54 extending inwardly from its other upper end at the other side thereof and including the vertical and horizontal shoulders 56, 58, is inserted transversely through each pair of aligned slots 40, 42 formed in each pair of standards 36, 38. The spacers 48 are positioned centrally of the longitudinal sides of the slots with the shoulders 56 engaging the adjacent outer marginal side portions of the slots 40 formed in the standards 36 and the shoulders 58 abut against the upper ends of each pair of slots 40, 42.

A pair of guide members 60 having vertically spaced and aligned openings 62 extending transversely therethrough, a rounded upper corner 64 and a flange 66 projecting from its upper end at the other side thereof are inserted through each pair of openings 40, 42 and are positioned in face-to-face contact on opposite sides of the spacer 48. In this instance the flanges 66 abut against the adjacent outer marginal portions of the sides of the slots 42.

The guide members 60 have their respective outer longitudinal sides 60a flush with the outer longitudinal sides 48a of the spacer 48, and the inner sides 60b thereof project beyond the inner sides 38a of the standards 38.

A pair of filler blocks 68 are provided for each end of the frame 10 and are arranged one on each side of each of the guide members 60. Each of the filler blocks is substantially rectangular in configuration and is formed with a pair of vertically spaced and aligned openings 70 and a notch 72 at one upper corner thereof, the outer corners 74, 76 of the notch being rounded.

The longitudinal dimension of the filler block 68 is equal to the longitudinal dimension of the guide members 60, but its transverse measurement is somewhat smaller.

The fillers 68 are inserted within the openings 40, 42 with their respective inner ends 68a flush with the plane of the inner side 38a.

In the described arrangement of the spacer, guide members and filler blocks, the openings 50, 62 and 70 thereof are horizontally aligned with each other and removably receive cylindrical lock pins 78, the pins 78 being tangent with the adjacent side of the standard 36 to releasably secure the spacer, guide members, filler blocks and standards, and the three base members together.

As is seen in Figures 1 and 3 of the drawings, inner ends 60b of each pair of guide members at one end of the frame 10 confront an identical pair of inner ends 60b of guide members 60 at the other end thereof and are adapted to slidably receive the marginal side edges 80a of a pair of transparent panels 80 between which is inserted a pair of pictures 82, 84 in back-to-back relationship.

Figure 8 illustrates a further embodiment of the invention wherein it is contemplated that the spacer block 48A could be provided with a polygonal opening 50A instead of the circular opening 50 as shown in Figure 6. The guide members and filler blocks 60 and 68 would be constructed with similar openings and an elongated substantially rectangular key would be substituted for the pin 78.

Figures 12 and 13 teach a still further modification wherein the spacer 48B is constructed with an elongated substantially rectangular slot 86 which extends inwardly from the lower end thereof and is spaced intermediate its longitudinal sides. As before, the slot 86 is substituted for the openings 50, and similar slots are formed in the guide members and fillers. A substantially rectangular lock piece 88 is adapted to be slidably received in the aligned slots.

Having described and illustrated three embodiments of this invention in detail, it will be understood that they are offered merely by way of example, and that the invention is to be limited only by the scope of the appended claims.

What is claimed is:

1. A picture frame including a base, said base comprising an elongated substantially rectangular primary member, an elongated substantially rectangular secondary member superposed on said primary member, the longitudinal and transverse dimensions of said secondary member being lesser than the corresponding dimensions of said primary member, a tertiary member having an elongated substantially rectangular configuration mounted on said secondary member in face-to-face contact therewith, said tertiary member having its longitudinal and transverse dimensions smaller than the corresponding dimensions of said secondary member, said primary, secondary and tertiary base members each having an elongated substantially rectangular transverse slot formed therein adjacent each of their respective ends, said slots being elongated in a direction substantially perpendicular to the longitudinal axes of said members and the ends of said slots at each end of said base being aligned one with another, a pair of elongated substantially rectangular standards having one of their respective adjacent ends slidably mounted within said slots adjacent one end of said base, a similar pair of elongated substantially rectangular standards having one of their respective ends slidably mounted within said slots formed at the other end of said base, guide means carried by each pair of standards, said guide means being in confronting relationship, and a pair of transparent elongated and substantially rectangular panels having their respective adjacent ends slidably mounted within said guide means.

2. A picture frame comprising a base which includes an elongated substantially rectangular primary member, an elongated substantially rectangular secondary member superposed on said primary member having its longitudinal and transverse dimensions smaller than the corresponding dimensions of said primary member, a tertiary base member having a substantially elongated rectangular configuration superposed on said secondary member and having its longitudinal and transverse dimensions smaller than the corresponding dimensions of said secondary member, said primary, secondary and tertiary base members having their longitudinal and transverse axes aligned with each other, each of said base members having an elongated substantially rectangular transverse slot formed therein adjacent each end thereof, the ends of said slots being aligned with each other and said slots extending substantially perpendicular with the longitudinal axes of said base members, a pair of elongated substantially rectangular standards having one of their respective ends mounted within said slots adjacent one end of said base, a second pair of elongated substantially rectangular standards having one of their respective ends disposed within said slots adjacent the other end of said base, the other ends of said pairs of standards projecting from said tertiary base member, each of said pairs of standards having an elongated substantially rectangular opening formed therein and aligned with each other, an elongated substantially rectangular spacer member disposed within each of said pairs of slots and having an end thereof engaging against said tertiary base member, abutment means on each of said spacers for engagement against a side of one of said standards, a pair of elongated substantially rectangular guide members disposed within each of said pairs of slots on opposite sides of said spacer members, said guide members having one of their respective ends engaging against said tertiary base member and being provided at the opposite ends thereof with means abutting against a side of the other of said standards, a pair of elongated substantially rectangular filler members disposed within each of said pairs of slots and positioned intermediate the sides of said pairs of slots and each of said guide members, said filler members having an end thereof engaging against said tertiary base member and the upper ends of said pairs of slots, and means for preventing displacement of said spacers, guide members and said fillers in directions transversely of said pairs of slots.

3. A picture frame as defined in claim 2, said means comprising the provision of a plurality of openings extending transversely of each of said spacers, guide members and fillers, said openings being aligned with each other, and a lock pin slidably mounted within said aligned openings and having tangential contact with said one of said standards.

4. A picture frame as defined in claim 3, said openings being substantially circular in configuration, and said lock pin being substantially cylindrical in shape.

5. A picture frame as defined in claim 2, and said means comprising a plurality of openings formed in said spacers, said guide members and said fillers, said openings extending transversely thereof and having a substantially polygonal configuration, and said lock pin having a polygonal configuration corresponding to the shape of said openings.

6. A picture frame as defined in claim 2, said means comprising an elongated slot formed in said spacers, said guide members and said fillers, said slots extending inwardly from an end of their respective elements intermediate the sides thereof, and a substantially rectangular locking element slidably mounted within said slots.

References Cited in the file of this patent
UNITED STATES PATENTS

| | | |
|---|---|---|
| D. 89,674 | Baetz | Apr. 25, 1933 |
| 1,893,168 | Hammer | Jan. 3, 1933 |
| 2,236,888 | Bishop | Apr. 1, 1941 |